United States Patent
Wynter et al.

(10) Patent No.: US 11,823,101 B2
(45) Date of Patent: Nov. 21, 2023

(54) ADAPTIVE DISPATCHING ENGINE FOR ADVANCED TAXI MANAGEMENT

(71) Applicant: International Business Machines Corporation, Armonk, NY (US)

(72) Inventors: Laura Wynter, Singapore (SG); Zhili Zhou, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/191,624

(22) Filed: Nov. 15, 2018

(65) Prior Publication Data

US 2020/0160251 A1    May 21, 2020

(51) Int. Cl.
| | |
|---|---|
| *G06Q 10/0631* | (2023.01) |
| *G06Q 10/02* | (2012.01) |
| *G06N 7/08* | (2006.01) |
| *G08G 1/00* | (2006.01) |
| *G06Q 50/30* | (2012.01) |

(52) U.S. Cl.
CPC ....... *G06Q 10/063112* (2013.01); *G06N 7/08* (2013.01); *G06Q 10/02* (2013.01); *G06Q 50/30* (2013.01); *G08G 1/202* (2013.01)

(58) Field of Classification Search
None
See application file for complete search history.

(56) References Cited

U.S. PATENT DOCUMENTS

| | | |
|---|---|---|
| 8,442,848 B2 | 5/2013 | Myr |
| 10,002,198 B2 | 1/2018 | Felt et al. |
| 2011/0099040 A1* | 4/2011 | Felt ........................ G06Q 50/30 |
| | | 715/764 |
| 2014/0100777 A1 | 4/2014 | Petroff |
| 2015/0081362 A1 | 3/2015 | Chadwick et al. |
| 2016/0042303 A1 | 2/2016 | Medina et al. |
| 2016/0364678 A1* | 12/2016 | Cao ........................ G06Q 50/30 |
| 2017/0200321 A1* | 7/2017 | Hummel ................ G06Q 50/30 |

(Continued)

FOREIGN PATENT DOCUMENTS

| | | | | |
|---|---|---|---|---|
| WO | WO-2009058117 A1 * | 5/2009 | ............. | G06Q 10/08 |

OTHER PUBLICATIONS

Jun Xu et al. Taxi Dispatch Planning via Demand and Destination Modeling, 2018 IEEE 43rd Conference on Local Computer Networks (LCN) (Year: 2018).*

(Continued)

*Primary Examiner* — Shelby A Turner
*Assistant Examiner* — Matthew H Divelbiss
(74) *Attorney, Agent, or Firm* — Harrington & Smith (57) ABSTRACT

A method of managing the adaptive dispatching of a taxi includes receiving a request for a taxi, the received request being from a passenger; scoring a taxi driver based on at least one of an acceptance rate for assignment, a rejection rate for assignment, an idle rate, and a frequency of job acceptance; scoring the passenger based on at least one of a cancellation rate, a booking frequency, an abandonment rate, and a blacklist factor; matching the passenger to a taxi driver based on the taxi driver score and the passenger score; assigning a passenger to a taxi driver based on one of a conditional historical acceptance rate and a stochastic assignment of either chance constraints or a conditional value at risk; and dispatching the taxi driver to the passenger.

19 Claims, 4 Drawing Sheets

(56) References Cited

U.S. PATENT DOCUMENTS

2017/0270447 A1\* 9/2017 Borean .................. G06Q 50/30
2017/0301054 A1  10/2017 Sangoi et al.

OTHER PUBLICATIONS

Zhang, Lingyu, et al., "A Taxi Order Dispatch Model based on Combinatorial Optimization", KDD 2017 http://www.kdd.org/kdd2017/papers/view/a-taxi-order-dispatch-model-based-on-combinatorial-optimization, 5 pages.

Mandle, Anurag, et al., "Taxi Automation Using Real Time Adaptive Scheduling", International Journal on Recent and Innovation Trends in Computing and Communication, vol. 2, Issue 3, Mar. 2014, pp. 592-594.

Yuan, Nicholas Jing, et al., "T-Finder: A Recommender System for Finding Passengers and Vacant Taxis", Proceedings of the 13th ACM International Conference on Ubiquitous Computing (UbiComp 2011), 14 pages.

\* cited by examiner

ADAPTIVE DISPATCHING ENGINE FOR ADVANCED TAXI MANAGEMENT

BACKGROUND

The exemplary embodiments described herein relate generally to the management of taxi services and, more specifically, to the use of predictive analytics to enable taxi dispatch companies to increase their market share and better retain clients and drivers.

Today, taxi companies and related services (such as GrabTaxi, Uber, as well as other commercial vendors) have the ability to leverage predictive analytics to better serve customers and drivers. For example, GrabTaxi allows a user to find the nearest taxi based on the user's location, thereby reducing wait times, as an algorithm in choosing the best taxi for a potential passenger is always the nearest interested driver. In another example, Uber allows for the use of a user profile (although there is no evidence for predictive analytics with regard to user profiles, nor is there any evidence of driver profiles and related analysis), with location being based on travel time estimation. Other taxi booking apps exist, some of which are popular in Asia, which utilize both passenger and driver profiles, but these apps do not employ conditional-based predictive analyses and further do not employ scoring systems or use adaptive algorithms. In other models, taxi dispatching is based on global positioning satellite (GPS) systems which only take account of passenger and taxi locations, single departure/arrival location-based taxi dispatching (such as at airports), and demand-driven approaches in which passenger demands are managed at an aggregated level.

The existing solutions used to address shortcomings of taxi dispatch have generally addressed only demand prediction or travel time prediction and not end-to-end solutions that leverage predictive analytics for various aspects of the for-hire transportation context that is in current use.

BRIEF SUMMARY

In accordance with one aspect, a computer system for managing the adaptive dispatching of a taxi comprises one or more memories having computer readable code; and one or more processors, where the one or more processors, in response to retrieving and executing the computer readable code, cause the computer system to perform the following: receiving a request for a taxi, the received request being from a passenger; scoring a taxi driver based on at least one of an acceptance rate for assignment, a rejection rate for assignment, an idle rate, and a frequency of job acceptance; scoring the passenger based on at least one of a cancellation rate, a booking frequency, an abandonment rate, and a blacklist factor; matching the passenger to a taxi driver based on the taxi driver score and the passenger score; assigning a passenger to a taxi driver based on one of a conditional historical acceptance rate and a stochastic assignment of either chance constraints or a conditional value at risk; and dispatching the taxi driver to the passenger.

In accordance with another aspect, a computer program product comprises a computer readable storage medium having program instructions embodied therewith, the program instructions executable by a computer system to cause the computer system to perform operations comprising: scoring a taxi driver based on at least one of an acceptance rate for assignment, a rejection rate for assignment, an idle rate, and a frequency of job acceptance; scoring a passenger based on at least one of a cancellation rate, a booking frequency, an abandonment rate, and a blacklist factor; matching the passenger to a taxi driver based on the taxi driver score and the passenger score; and assigning a passenger to a taxi driver based on one of a conditional historical acceptance rate and a stochastic assignment of either chance constraints or a conditional value at risk.

In accordance with another aspect, a method of managing the adaptive dispatching of a taxi comprises receiving a request for a taxi, the received request being from a passenger; scoring a taxi driver based on at least one of an acceptance rate for assignment, a rejection rate for assignment, an idle rate, and a frequency of job acceptance; scoring the passenger based on at least one of a cancellation rate, a booking frequency, an abandonment rate, and a blacklist factor; matching the passenger to a taxi driver based on the taxi driver score and the passenger score; assigning a passenger to a taxi driver based on one of a conditional historical acceptance rate and a stochastic assignment of either chance constraints or a conditional value at risk; and dispatching the taxi driver to the passenger.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
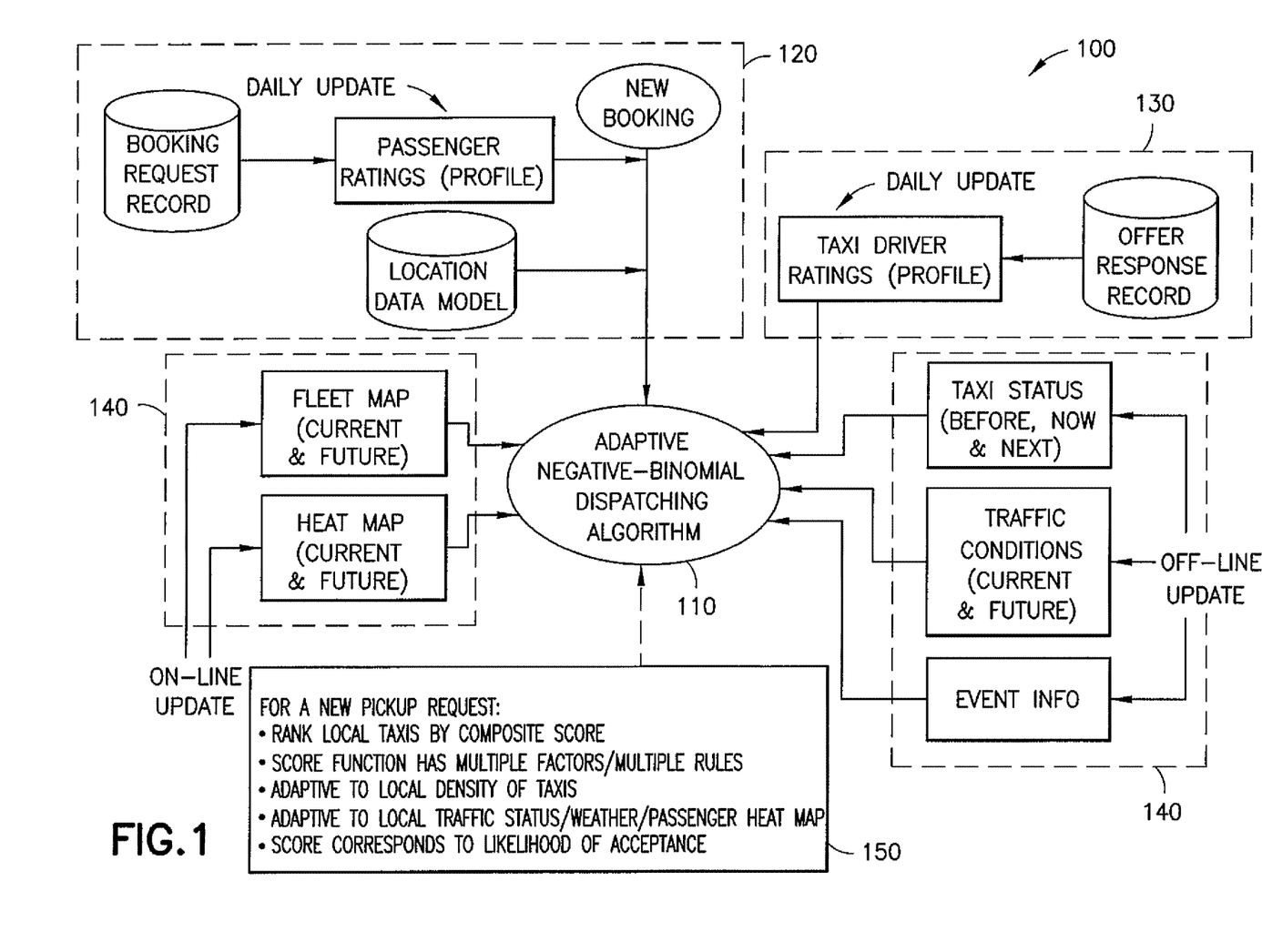
FIG. 1 is a schematic representation of an adaptive dispatching engine that employs an adaptive negative-binomial dispatching algorithm.

Referring to FIG. 1, one exemplary embodiment of an adaptive dispatching engine (ADE) for use in a taxi dispatching system is shown generally at 100 and is hereinafter referred to as "ADE 100." ADE 100 comprises an adaptive negative-binomial distribution algorithm 110, which receives inputs based on a passenger profiling engine 120, a driver profiling engine 130, and a route travel time prediction engine 140. The algorithm 110 is based on negative binomial distribution, which is a discrete probability distribution of the number of successes in a sequence of independent and identically distributed trials before a specified (non-random) number of failures occurs. The algorithm 110 is adaptive in that it changes based on evolving patterns of demand and supply. Overall, the algorithm 110 operates on the inputs from the engines 120, 130, and 140 and outputs a score to a scoring and matching engine 150. The input components serve to jointly lead to a dramatically increased likelihood of taxi driver booking acceptance and final service satisfaction level, which includes metrics such as time-to-arrive to the passenger.

The passenger profiling engine 120 may be directed to passenger identification, for example, identification according to the booking phone/cell number, booking request history including journeys, times, dates (for both start and end times of journeys), distances, prices paid, origins-destinations, vehicle type requests, cancellations (time of cancellation with respect to booking time and taxi arrival time), stored "favorites," frequencies of journeys, histories of abandonments after booking, and the like. Using this data, and based on recommender systems technology as used to provide personalized recommendations for online e-commerce sites and the like, passenger profile scores may be computed for each passenger who uses an electronic device such as mobile phone, smart phone, SMS, or other device as a booking tool linked to the ADE 100. The booking tool linked to the ADE 100 may be an app downloaded to the passenger's smart phone and operably associated with a taxi dispatch center. With such passenger profiles, passengers (or at least the person to whom the device belongs) could be scored to reflect their historical performance. Better historical performance of a passenger may lead to higher scores, thus allowing "preferred" passengers to be more readily picked up by a driver. A "blacklist" of passengers could be created for passengers with abandonment rates above a particular threshold. This passenger profiling engine 120 may also take into account passenger performance based on other conditions, such as weekday/weekend usage, peak/off-peak usage, weather conditions, and the like, thus leading to the fine-tuning of parameters in both the passenger profiling engine 120 and the driver profiling engine 130.

In the passenger profiling engine 120, J is the set of booking passengers and j is the index for a booking passenger at assignment time. To reflect conditional-based passenger scores, $p_j(t, \tau, v_j, f_j, a_j, b_j, \ldots)$ is used to represent the calibrated passenger score for passenger j which is a function or a probabilistic function of passenger cancellation rate $v_j(t, \tau, \ldots)$ (a function of booking, assignment time and other factors), booking frequency $f_j$, abandoning rate $a_j(t, \tau, \ldots)$ (a function of booking, assignment time, and other factors), an indicator $b_j$ (whether the passenger is on the blacklist), and other factors at the assignment time $\tau$.

The driver profiling engine 130 may be directed to taxi driver identification. Taxi driver identification may be based on booking history including jobs proposed and rejected, jobs proposed and accepted and completed, and jobs proposed, accepted but not completed, due, for example, to passenger cancellation/abandoning or driver abandoning. The nature of the jobs in each of these three categories may include time, day, location of taxi, distance of job, origin-destination, price (paid or estimated), inclement or good weather, frequency of jobs accepted per day and as a function of jobs proposed, proportion of booking versus flag-down, and/or the idleness of the driver (for example, based on time and location data of each taxi, which may be collected at least every minute, on a device (such as a smart phone, tablet, GPS device or other tracking apparatus, or other electronic device) at, in, or at least associated with a taxi).

Using this data, and based on recommender systems technology, driver profile scores may be computed for each driver. Similar to the passenger scoring, drivers may be scored based on their historical working performance. Through the statistical analysis, the main deterministic factors (for example, the rejection history, the duration of the idleness in different weather conditions, and the like) may carry greater weights as compared to other factors. Better performance of a driver may lead to higher driver scores.

In driver scoring, $q_d(\tau, a_d, r_d, i_d, f_d, \ldots)$ is used to represent the calibrated driver scores for driver d, a function or a probabilistic function of drivers' acceptance rate for assignment $a_d(\tau, \ldots)$ (a function of assignment time and other factors), the rejection rate for assignment $r_d(\tau, \ldots)$ (a function of assignment time and other factors), the idle rate (with assigned taxi, but not driving) $i_d(w(\tau), \tau)$ (a function of weather condition $w(\tau)$ at the booking time and the booking time), the daily frequency of job acceptance $f_d$, and other factors at an assignment time $\tau$.

Driver and taxi matching and schedule prediction may be carried out, in which pinpoint locations of assigned taxis are detected and recorded by the taxi dispatching center, which assigns taxis to passengers. Detection of locations may be effected using GPS technology, and recording of locations and any attendant analysis may be carried out on a server. However, a successful assignment (a driver accepts an assignment and picks up the assigned booking passenger) mainly depends on whether a driver (driving an assigned taxi) accepts/rejects an assignment instead of the availability of a taxi. The driver accepting or rejecting an assignment may be made through the driver communicating with the server through the driver's device. In the driver profiling engine 130, the connection between drivers and assigned taxis is built. With collected data (driver identification, taxi identification, taxi assignment status (assigned/idle), driving shift, driving time, idle time when taxi is assigned, and the like), the assignment relation and schedule between taxis and drivers could be built and predicted. For example, a driver may operate a taxi during a day or night shift, and a taxi assigned to the driver may be idle at lunch time. The driver profiling engine 130 may further extend drivers' profiles and exactly build the one-to-one matching between an assigned taxi and a driver for further assignment according to various conditions (for instance, the different times in a day).

In doing so, l is used to represent the available taxis in the booking system at the booking time. The function $M(i, \tau)$ is used to indicate the driver of the taxi i mapping at the assignment time $\tau$. The one-to-one mapping information is obtained from the taxi and driver daily assignment schedule, i.e., $M(i, \tau)=d$ or the predicted assignment schedule, where $M(i, \tau)$ is a probabilistic function for the assignment of driver d at assignment time $\tau$.

With both the passenger profiling engine 120 and the driver profiling engine 130, behaviors of both passengers and drivers (related to taxi assignment) could be quantified and utilized as weights in the scoring and matching engine 150.

With regard to the route travel time prediction engine 140, drivers who are within a predetermined radius (e.g., 3 kilometers) from a calling passenger may be paired with the passenger as a potential pick up. For each pair of potential driver/passenger bookings, the expected route travel time may be computed using current and predicted traffic conditions. In doing so, first, the potential driving routes between each pair are calibrated. Based on selected potential driving routes (the driving distance of a route is less than conditional distance thresholds), expected route travel time and the distance thresholds take into account traffic congestion, weather, road closures, traffic incidents, and the geo-spatial road network.

For each booking passenger j and available taxi i (mapped driver d), geographic location information with latitude and longitude data is obtained. $\Lambda_\tau=\{(i, d, j)\}_\tau$, indicates potential driver (taxi) and passenger pairs at assignment time $\tau$. Aftermath, all operations are based on $\Lambda_\tau$ at the assignment time $\tau$. For each pair (i, d, j), P(i, j) represents for the set of potential routes between locations of taxi i and passenger j with (i, d, j)$\varepsilon\Lambda_\tau$, which is within the travel time distance threshold $\Gamma(\tau, W(\tau), \ldots)$ (a function of assignment time $\tau$, weather condition, and other factors). Based on the potential routes, the expected travel time between locations of taxi i and passenger j, i.e., $E(t(i, d, j, \tau))$, is calibrated, through two approaches, namely, the expected travel time of the shortest travel time potential routes and the expected travel time of selected potential routes (within the travel distance thresholds). Note here with different probabilistic expressions, the expected travel time could be a number or a probability function.

The scoring and matching engine 150 presents the passenger profile scores, driver profile scores, and the route travel time predictions from the adaptive dispatching algorithm 110 and outputs a set of ranked matches of selected potential driver-passenger pairs in order from highest match to lowest within a pre-defined maximum. For instance, a matched score could be determined by a linear combination of the score of on-call passenger and drivers and the predicted travel time. The maximum number is a parameter which depends upon the current conditions and on the scores themselves.

In other words, if all matching scores are low, a larger number of matches are presented for dissemination to drivers. Matching scores may be low if the passenger and driver profiles are not well-adapted, if the route travel time predictions are long, and/or if other factors are present that lower scores (inclement weather, road construction, and the like).

Therefore, both the set of drivers to disseminate the potential job to as well as the number of drivers selected depend upon the scoring output of the ADE 100 itself.

Figure 2:
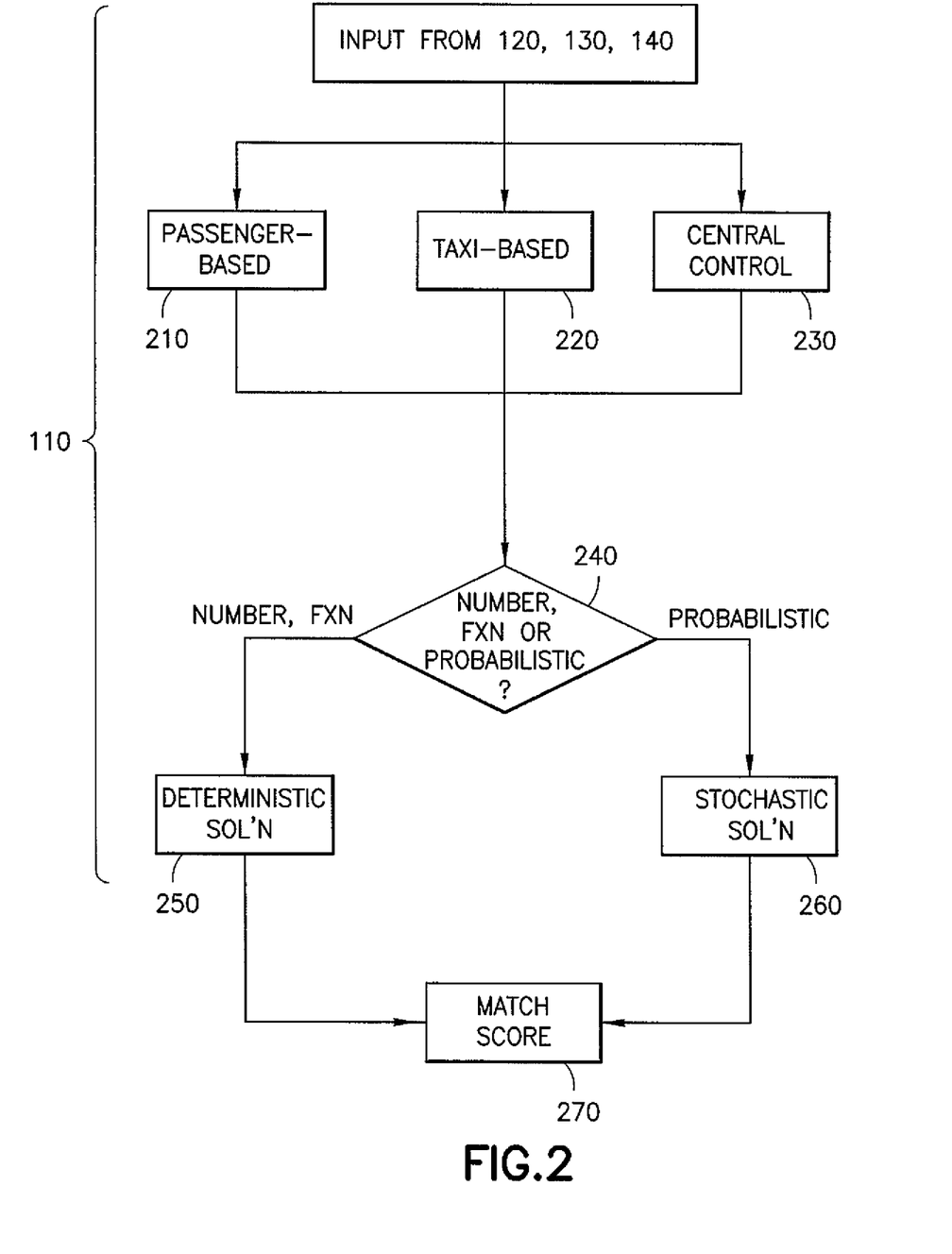
FIG. 2 is a flow of operations of the adaptive dispatching engine of FIG. 1 through various optimization models to provide matching scores for passenger/taxi-related entities.

Referring now to FIG. 2, the adaptive dispatching algorithm 110 may utilize three approaches (three models) to optimize values and provide the highest matching scores for passenger, taxi, and taxi dispatching control centers. These approaches are denoted as a passenger-based model 210, a taxi-based model 220, and a central-control model 230, respectively, with at least the passenger-based model 210 and the taxi-based model 220 being accordingly weighted so as to provide optimal matching results. The weights may be modified in a trial-and-error approach by setting the weights, implementing the result, and observing the resulting matching rates, then modifying the weights and repeating the process. In such models, $x_{ij}$ is a binary variable, which indicates whether taxi i and passenger f is matched. A vector $\omega(w_p, w_c, w_t)$ denotes the weights applied to the passenger score, driver score, and the expected travel time.

In the passenger-based model 210, the goal is to select the highest scored driver (taxi driver) for each booking passenger:

$$\max F(w, p_j, q_d, E(t), x)$$

$$s.t. \Sigma_{i \in I} x_{ij} \leq \Gamma(w(t), t), j \in J$$

$$x_{ij} \in (0,1), i \in I, j \in J$$

where d=M(i, $\tau$) when driver and taxi schedule is known, otherwise, d is a potential assigned driver for taxi i with probability M(i, $\tau$).

In the taxi-based model 220, the goal is to select the highest scored passenger for each available taxi and driver:

$$\max F(w, p_j, q_d, E(t), x)$$

$$s.t. \in_{j \in J} x_{ij} \leq \Gamma(w(t), t), i \in I$$

$$x_{ij} \in (0,1), i \in I, j \in J$$

where d=M(i, $\tau$) when driver and taxi schedule is known, otherwise, d is a potential assigned driver for taxi i with probability M(i, $\tau$).

In the central-control model 230, the goal is from a dispatching perspective to select the highest scored pairs (driver, passenger):

$$\max F(w, p_j, q_d, E(t), x)$$

$$s.t. \sum_{j \in J} x_{ij} \leq \Gamma(w(t), t), \quad i \in I$$

$$\sum_{i \in I} x_{ij} \leq \Gamma(w(t), t), \quad j \in J$$

$$x_{ij} \in (0, 1), \quad i \in I, j \in J$$

where d=M(i, $\tau$) when driver and taxi schedule is known, otherwise, d is a potential assigned driver for taxi i with probability M(i, $\tau$). An outcome of the central-control model 230 may be one or more scoring functions and estimated travel times.

The scoring function(s) and estimated travel times from the central-control model 230 could be numbers, linear/nonlinear functions, and probabilistic functions, which may be accordingly classified at junction 240. When the outcomes of all scoring functions and travel time estimation functions are numbers or functions, then, we could consider deterministic approaches, as indicated at block 250, for either a linear program or a nonlinear program to solve above models, for instance:

$$\max \sum_{i \in I} \sum_{j \in J} (w_p p_j(t, \tau, v_j, f_j, a_j, b_j, \ldots) + w_c q_d(\tau, a_d, r_d, i_d, f_d, \ldots) + w_t E(t(i, d, j, \tau))) x_{ij}$$

When these outcomes are probabilistic functions, then with maximizing expected value, or maximizing the expected value and minimizing the deviations, the models could be solved through stochastic program solution approaches as indicated at block 260, for instance:

$$\max E\{\Sigma_{i \in I} \Sigma_{j \in J}(w_p p_j(t, \tau, v_j, f_j, a_j, b_j, \ldots) + w_c q_d(\tau, a_d, r_d, i_d, f_d, \ldots) + w_t E(t(i, d, j, \tau))) x_{ij}\}$$

Note here that with various passenger and driver scores, the above proposed models would be deterministic models or stochastic models. Corresponding optimization solution approaches would be applied to solve such problems.

In making a match, as indicated at 270, based on the matching score, the probability for a job (an on-call passenger) to be taken by different matched drivers could be calibrated through or with or without other factors, for instance, weather. A simple approach is to directly transfer the matching scores among the maximum numbers of matching pairs and utilize the ratio between the matching score of a pair and the total matching scores for all pairs.

Figure 3:
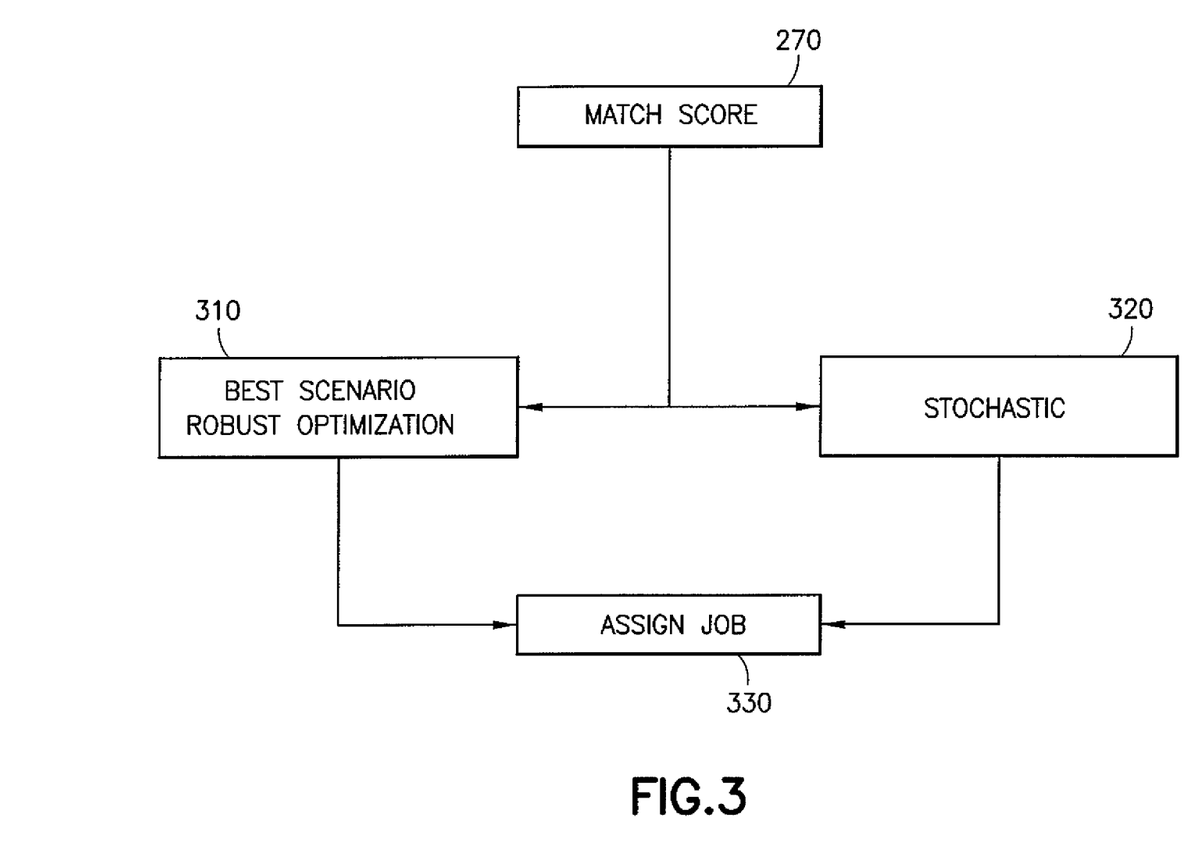
FIG. 3 is a flow of one exemplary computational process for assigning a taxi job.

Referring now to FIG. 3, from the above block 270, an approach is carried out to conduct the job assignment to the highest scored driver and passengers at the job assignment time. However, more reliable job assignment with multiple key performance indicators (KPIs) may be sought.

Whether a job is successfully assigned is determined by whether the driver accepts the assigned job and the booking passenger keeps waiting until the driver picks them up. What is considered is the job acceptance probability as a KPI for the dispatching, which is the ratio between the successful assignment and the total assignment at assignment time. Note here that the job acceptance rate is a KPI to evaluate post-assignment performance. The exact value of the job acceptance rate only could be quantified when each assigned job is realized. To better quantify the performance of the ADE 100, quantification for this KPI through the lower and upper bound estimation and the risk management is provided.

First, with data in both passenger and driver profiles, it is possible to build and predict the conditional-based acceptance probability for both drivers and passengers, where the passenger acceptance of an assignment is defined as that after booking, the passenger waits and boards the assigned taxi. On the other hand, the acceptance of a driver may be that the driver accepts the assigned passenger request and the taxi appears in the request location. Correspondingly, passenger historical acceptance probability may be defined as the ratio between the number of passenger-accepted assignments and the total number of bookings and the total number of job assignments, and the probability between the number of driver accepted assignments and the total number of assignments to the driver. With a sufficient data set, conditional-based passenger and driver historical acceptance rates could be obtained and predicted.

Two approaches are utilized to conduct the job assignment to estimate the potential system acceptance probability with different assignment strategies. The first approach, indicated at 310, includes two components: a best scenario upper bound and a robust optimization lower bound. In this approach, with conditional-based passenger and driver historical acceptance rates, the lower and upper bounds of their acceptance rates could be calibrated. The best scenario upper bound (assuming paired passengers and drivers are within the upper bounds of their acceptance rate) is used to calibrate one-to-one assignments of taxis to passengers to maximize the entire systems' acceptance rate. These assignment strategies represent an upper bound and optimistic assignment strategy. On the other hand, robust optimization may be adopted to determine maximal system acceptance rate when the worst acceptance rates of passengers and drivers are considered. This approach provides a lower bound for system assignment and pessimistic assignment strategy.

The conditional-based driver and passenger historical acceptance rates may be generated as probabilistic functions of booking time t, assignment time τ, weather conditions w(t), booking locations loc(j), travel time E[t(•)], and waiting time τ−t, etc. We let $\alpha_i(t, \tau, w(t), loc(j), E[t(•)])$ and $\beta_j(t, \tau, w(t), loc(j), E[t(•)])$ be the acceptance probability for driver and passengers correspondingly.

$$\min_x G(\alpha, \beta, x, t, \tau)$$
$$\text{s.t.} \sum_{i \in I} x_{ij} = 1, \ j \in J$$

$$\sum_{j \in J} x_{ij} = 1, \ i \in I$$

$$x_{ij} \in (0, 1), \ i \in I, j \in J$$

The objective function G (α, β, x, t, τ) could be linear and nonlinear functions. For example, when both α(•) and β(•) are linear or nonlinear functions, we have $$G(\alpha, \beta, x, t, \tau) = \sum_{ij} (1 - \alpha_i(t, \tau, w(t), loc(j), E[t(\cdot)]))(1 - \beta_j(t, \tau, w(t), loc(j), E[t(\cdot)]))$$

and applying corresponding solution approaches, we could provide the job assignment to dispatch taxi and passengers to maximize the acceptance rate.

The second approach, as indicated at 320, is the stochastic assignment approach, in which stochastic assignment models are derived with either chance constraints or a conditional value at risk (CVaR) to manage the system risk of potential rejections.

With the above as a base, a job may be finally assigned, as indicated at 330, as a function that not only maximizes the job acceptance rate by the driver but also the service quality as perceived by the passenger. Specifically, the job assignment is based on the matched scores of each driver-passenger potential match, as well as other parameters of the booking procedure including time taken between driver reception of the booking and acceptance of the job (faster response time indicates better likely quality of service for the passenger), and expected travel time to the passenger, based on current and predicted travel time including congestion. With a sufficiently large data set, it is possible to obtain probabilities for not only the job acceptance and the acceptance rates for both passengers and drivers, but also for the intervals of potential travel times between matched passenger and driver. Based on this, a multi-criteria stochastic job assignment model could be formulated in which a driver is assigned to passengers with minimal expected travel time and the maximal expected acceptance rate. In essence, when more jobs are available, each driver is "bidding" for the job, and the selection of the driver is based on the above scores and parameters. On the other hand, the passengers could pay for the incentives to have priority to be first assigned to a driver.

Figure 4:
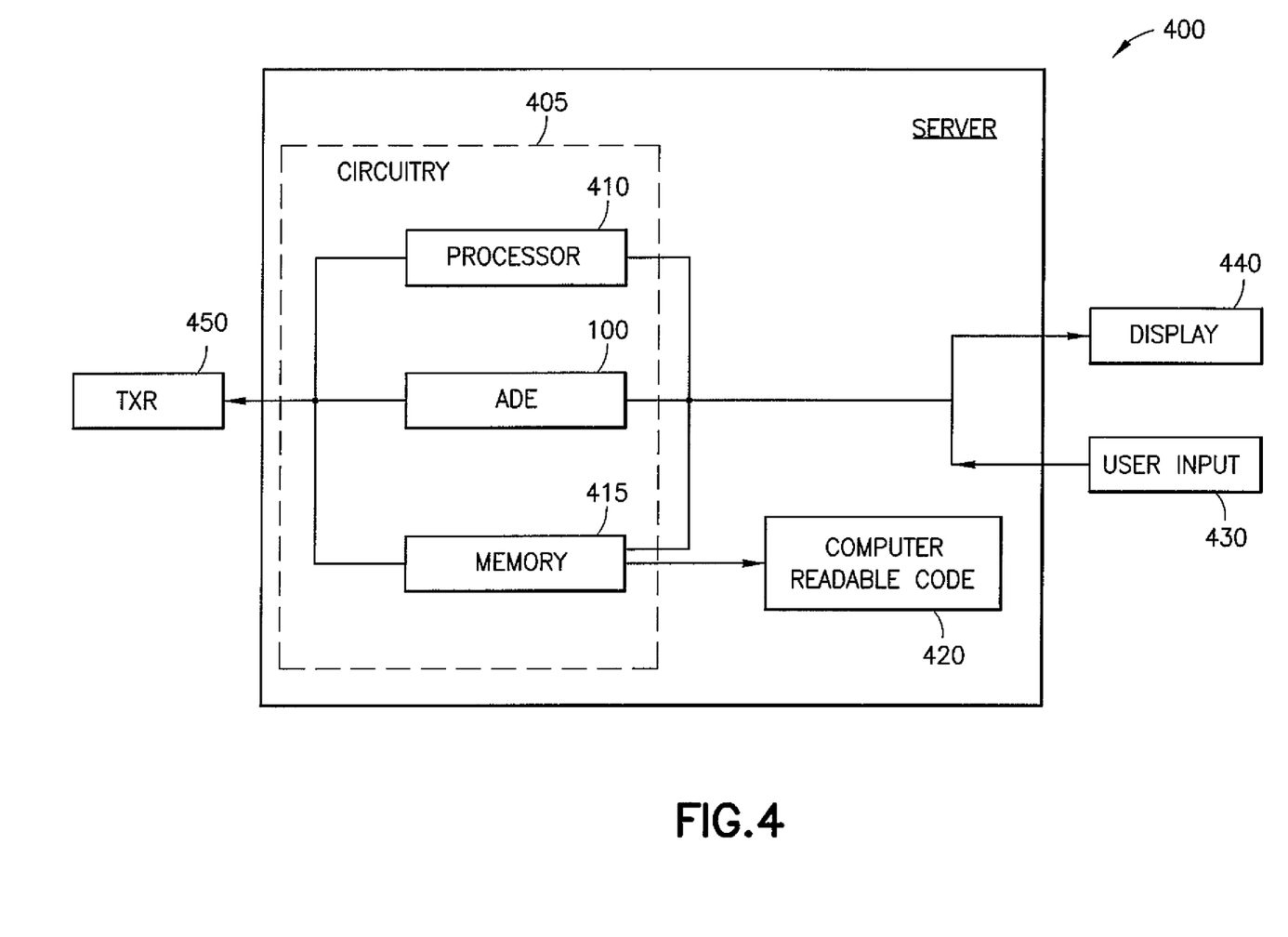
FIG. 4 is a block diagram of one possible internal configuration of elements of a system using the adaptive dispatching engine of FIG. 1.

Referring to FIG. 4, the ADE 100 may be part of a computer system or server 400 having circuitry 405 with one or more processors 410 and associated memories 415. The memories 415 may include computer readable code 420, which when accessed and executed by the one or more processors 410, causes the computer system or server 400 to perform the operations described herein, such as those described in the Figures. The ADE 100 may be implemented in whole or part in the circuitry 405, which itself may implement the one or more memories 415 and the one or more processors 410. For instance, the ADE 100 may be implemented in an integrated circuit or as part of a programmable logic device. User input to the computer system or server 400 may be received through a user input device 430 (for example, from online updates, from a dispatcher, from fleet maps, from heat maps, and the like). User input to the computer system or server 400 may also encompass a passenger request for taxi service, for example through an app or the like. Output may be provided from the computer system or server 400 at the taxi dispatch center (to a person monitoring the server 400, if desired) via any suitable display 440 (for example, a graphical user interface (GUI)). Using the ADE 100, a transmitter 450 may be directed to transmit an instruction to a driver.

In any of the foregoing exemplary embodiments, the ADE 100 benefits the passenger, the taxi driver, the taxi company, and any regulatory authorities overseeing the taxi company. The ADE 100 significantly improves driver acceptance rates, thus shortening booking-dispatch cycle times, and it provides high satisfaction of authority-imposed service-level agreements. Also, by making use of passenger profiles, the embodiments described herein lead to higher taxi acceptance rates of offered bookings. Route travel time prediction is also improved, thus leveraging traffic congestion, incidents, and other geo-spatial road features to translate into faster access times from a selected taxi to a passenger. Furthermore, the use of historical data with predictive analytics leads to optimal driver deployment across different geographical areas as well as less driver idling time on the road.

In one example, a computer system for managing the adaptive dispatching of a taxi comprises one or more memories having computer readable code; and one or more processors, where the one or more processors, in response to retrieving and executing the computer readable code, cause the computer system to perform the following: receiving a request for a taxi, the received request being from a passenger; scoring a taxi driver based on at least one of an acceptance rate for assignment, a rejection rate for assignment, an idle rate, and a frequency of job acceptance; scoring the passenger based on at least one of a cancellation rate, a booking frequency, an abandonment rate, and a blacklist factor; matching the passenger to a taxi driver based on the taxi driver score and the passenger score; assigning a passenger to a taxi driver based on one of a conditional historical acceptance rate and a stochastic assignment of either chance constraints or a conditional value at risk; and dispatching the taxi driver to the passenger.

Matching the passenger to a taxi driver based on the taxi driver score and the passenger score may comprise selecting, by the passenger, a taxi driver based on the taxi driver score exceeding a predetermined threshold, selecting, by the taxi driver, a passenger based on the passenger score exceeding a predetermined threshold, and selecting a passenger and a taxi driver based on the taxi driver score and the passenger score. Selecting a passenger and a taxi driver based on the taxi driver score and the passenger score may comprise solving a function by applying one of a deterministic approach and a stochastic approach. Matching the passenger to a taxi driver based on the taxi driver score and the passenger score may comprise applying a weight to one or more of the taxi driver score and the passenger score. Assigning a passenger to a taxi driver based on a conditional historical acceptance rate may comprise calibrating an upper bound and a lower bound of the conditional historical acceptance rate, wherein calibrating an upper bound may comprise determining a taxi driver for each corresponding passenger based on a matched passenger and taxi driver exceeding a threshold score, and wherein calibrating a lower bound may comprise determining a maximal system acceptance rate based on the matched passenger and taxi driver not exceeding the threshold score. The conditional historical acceptance rate may be generated as a probabilistic function of one or more of booking time, assignment time, weather conditions, booking locations, travel time, and waiting time.

Receiving a request for a taxi may comprise the passenger requesting, through an electronic device associated with the passenger, a taxi to be dispatched to a location of the passenger, and dispatching the taxi driver to the passenger may comprise the taxi driver receiving, through an electronic device associated with the taxi driver, an instruction to proceed to the location of the passenger.

In another example, a computer program product comprises a computer readable storage medium having program instructions embodied therewith, the program instructions executable by a computer system to cause the computer system to perform operations comprising: scoring a taxi driver based on at least one of an acceptance rate for assignment, a rejection rate for assignment, an idle rate, and a frequency of job acceptance; scoring a passenger based on at least one of a cancellation rate, a booking frequency, an abandonment rate, and a blacklist factor; matching the passenger to a taxi driver based on the taxi driver score and the passenger score; and assigning a passenger to a taxi driver based on one of a conditional historical acceptance rate and a stochastic assignment of either chance constraints or a conditional value at risk.

Matching the passenger to a taxi driver based on the taxi driver score and the passenger score may comprise determining a taxi driver based on the taxi driver score exceeding a predetermined threshold, determining a passenger based on the passenger score exceeding a predetermined threshold, and determining a paired passenger and taxi driver based on the taxi driver score and the passenger score. Determining a paired passenger and taxi driver based on the taxi driver score and the passenger score may comprise solving a function by applying one of a deterministic approach and a stochastic approach. Matching the passenger to a taxi driver based on the taxi driver score and the passenger score may comprise applying a weight to one or more of the taxi driver score and the passenger score. Assigning a passenger to a taxi driver based on a conditional historical acceptance rate may comprise calibrating an upper bound and a lower bound of the conditional historical acceptance rate. Calibrating an upper bound may comprise determining a taxi driver for each corresponding passenger based on a matched passenger and taxi driver exceeding a threshold score. Calibrating a lower bound may comprise determining a maximal system acceptance rate based on the matched passenger and taxi driver not exceeding the threshold score. The conditional historical acceptance rate may be generated as a probabilistic function of one or more of booking time, assignment time, weather conditions, booking locations, travel time, and waiting time.

In another example, a method of managing the adaptive dispatching of a taxi comprises receiving a request for a taxi, the received request being from a passenger; scoring a taxi driver based on at least one of an acceptance rate for assignment, a rejection rate for assignment, an idle rate, and a frequency of job acceptance; scoring the passenger based on at least one of a cancellation rate, a booking frequency, an abandonment rate, and a blacklist factor; matching the passenger to a taxi driver based on the taxi driver score and the passenger score; assigning a passenger to a taxi driver based on one of a conditional historical acceptance rate and a stochastic assignment of either chance constraints or a conditional value at risk; and dispatching the taxi driver to the passenger.

Matching the passenger to a taxi driver based on the taxi driver score and the passenger score may comprise selecting, by the passenger, a taxi driver based on the taxi driver score exceeding a predetermined threshold, selecting, by the taxi driver, a passenger based on the passenger score exceeding a predetermined threshold, and selecting a passenger and a taxi driver based on the taxi driver score and the passenger score. Selecting a passenger and a taxi driver based on the taxi driver score and the passenger score may comprise solving a function by applying one of a deterministic approach and a stochastic approach. Assigning a passenger to a taxi driver based on a conditional historical acceptance rate may comprise calibrating an upper bound and a lower bound of the conditional historical acceptance rate. Calibrating an upper bound may comprise determining a taxi driver for each corresponding passenger based on a matched passenger and taxi driver exceeding a threshold score, and calibrating a lower bound may comprise determining a maximal system acceptance rate based on the matched passenger and taxi driver not exceeding the threshold score. The conditional historical acceptance rate may be generated as a probabilistic function of one or more of booking time, assignment time, weather conditions, booking locations, travel time, and waiting time. Receiving a request for a taxi may comprise the passenger requesting, through an electronic device associated with the passenger, a taxi to be dispatched to a location of the passenger. Dispatching the taxi driver to the passenger may comprise the taxi driver receiving, through an electronic device associated with the taxi driver, an instruction to proceed to the location of the passenger.

In the foregoing description, numerous specific details are set forth, such as particular structures, components, materials, dimensions, process or method steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or process or method steps may have been omitted or may have not been described in order to avoid obscuring the presented embodiments.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

What is claimed is:

1. A computer system for managing the adaptive dispatching of a taxi, the computer system comprising:
    one or more memories having computer readable code; and
    one or more processors, where the one or more processors, in response to retrieving and executing the computer readable code, cause the computer system to perform the following:
        receiving a request for a taxi, the received request being from a passenger;
        identifying the passenger based on at least one of a phone number and a request history;
        detecting a location of a first taxi having a first driver and a second taxi having a second driver, using global positioning satellite technology;
        mapping the first taxi driver and the second taxi driver to the request for the taxi;
        scoring each of the first taxi driver and the second taxi driver based on a deterministic factor comprising at least one of an acceptance rate for assignment, a rejection rate for assignment, an idle rate, and a frequency of job acceptance, wherein a score of the first taxi driver and a score of the second taxi driver are determined using statistical analysis in which at least a first deterministic factor carries a greater weight as compared to a second deterministic factor;
        scoring the passenger based on at least one of a cancellation rate, a booking frequency, an abandonment rate, and a blacklist factor;
        predicting a schedule for the first taxi driver and the second taxi driver to drive the passenger to a requested location, the predicted schedule being determined by an algorithm that adapts to a change based on an evolving pattern determined by at least the received request from the passenger, the detected location of the first taxi, and the detected location of the second taxi, the change being determined by an adjustment to weights based on a taxi driver score, a passenger score, and a combined score of the taxi driver and the passenger;
        matching the passenger to the first taxi driver and the second taxi driver based on the respective taxi driver score, the passenger score, and the combined score of the respective taxi driver and the passenger, wherein the respective taxi driver score is computed based on a calibrated driver profile score derived from historical working performance calculated from an acceptance rate as a function of assignment time, a rejection rate as a function of assignment time, an idle rate as a function of a weather condition at the assignment time and as a function of the assignment time, and a frequency of job acceptance, wherein matching the passenger to the first taxi driver and the second taxi driver based on the respective taxi driver score and the passenger score comprises selecting, by the passenger, a respective taxi driver based on the taxi driver score exceeding a predetermined threshold, and selecting, by the respective taxi driver, a passenger based on the passenger score exceeding a predetermined threshold;
        outputting a set of ranked matches comprising a first pair of the first taxi driver with the passenger and a second pair of the second taxi driver with the passenger;
        assigning the passenger to one of the first taxi driver or the second taxi driver based on at least one of the set of ranked matches or at least one of,
            a conditional historical acceptance rate of the respective taxi driver,
            a stochastic assignment of either chance constraints or a conditional value at risk, or
            acceptance by the respective taxi driver; and
        dispatching the assigned first taxi driver or the assigned second taxi driver to the passenger.

2. The computer system of claim 1, wherein matching the passenger to the first taxi driver and the second taxi driver based on the taxi driver score and the passenger score further comprises selecting a passenger and a taxi driver based on the taxi driver score and the passenger score.

3. The computer system of claim 2, wherein selecting a passenger and a taxi driver based on the taxi driver score and the passenger score comprises solving a function by applying one of a deterministic approach and a stochastic approach.

4. The computer system of claim 1, wherein matching the passenger to the first taxi driver and the second taxi driver based on the taxi driver score and the passenger score comprises applying a weight to one or more of the respective taxi driver score and the passenger score.

5. The computer system of claim 1, wherein assigning a passenger to one of the first taxi driver and the second taxi driver based on a conditional historical acceptance rate comprises calibrating an upper bound and a lower bound of the conditional historical acceptance rate, wherein calibrating an upper bound comprises determining a taxi driver for each corresponding passenger based on a matched passenger and taxi driver exceeding a threshold score, and wherein calibrating a lower bound comprises determining a maximal system acceptance rate based on the matched passenger and taxi driver not exceeding the threshold score.

6. The computer system of claim 1, wherein the conditional historical acceptance rate is generated as a probabilistic function of one or more of booking time, assignment time, weather conditions, booking locations, travel time, and waiting time.

7. The computer system of claim 1, wherein receiving a request for a taxi comprises the passenger requesting, through an electronic device associated with the passenger, a taxi to be dispatched to a location of the passenger, and wherein dispatching the taxi driver to the passenger comprises the taxi driver receiving, through an electronic device associated with the taxi driver, an instruction to proceed to the location of the passenger.

8. A computer program product comprising a computer readable storage medium having program instructions embodied therewith, the program instructions executable by a computer system to cause the computer system to perform operations comprising:
  identifying a passenger based on at least one of a phone number and a request history;
  detecting a location of a first taxi having a first driver and a second taxi having a second driver, using global positioning satellite technology;
  mapping the first taxi driver and the second taxi driver to a request for the taxi;
  scoring each of the first the taxi driver and the second taxi driver based on a deterministic factor comprising at least one of an acceptance rate for assignment, a rejection rate for assignment, an idle rate, and a frequency of job acceptance, wherein a score of the first taxi driver and a score of the second taxi driver are determined using statistical analysis in which at least a first deterministic factor carries a greater weight as compared to a second deterministic factor;
  scoring the passenger based on at least one of a cancellation rate, a booking frequency, an abandonment rate, and a blacklist factor;
  predicting a schedule for the first taxi driver and the second taxi driver to drive the passenger to a requested location, the predicted schedule being determined by an algorithm that adapts to a change based on an evolving pattern determined by at least the received request from the passenger, the detected location of the first taxi, and the detected location of the second taxi, the change being determined by an adjustment to weights based on a taxi driver score, a passenger score, and a combined score of the taxi driver and the passenger;
  matching the passenger to the first taxi driver and the second taxi driver based on the respective taxi driver score, the passenger score, and the combined score of the respective taxi driver and the passenger, wherein the respective taxi driver score is computed based on a calibrated driver profile score derived from historical working performance calculated from an acceptance rate as a function of assignment time, a rejection rate as a function of assignment time, an idle rate as a function of a weather condition at the assignment time and as a function of the assignment time, and a frequency of job acceptance, wherein matching the passenger to the first taxi driver and the second taxi driver based on the respective taxi driver score and the passenger score comprises responding to a passenger input whereby the passenger selects a respective taxi driver based on the respective taxi driver score exceeding a predetermined threshold, and responding to a taxi driver input whereby the respective taxi driver selects a passenger based on the passenger score exceeding a predetermined threshold;
  outputting a set of ranked matches comprising a first pair of the first taxi driver with the passenger and a second pair of the second taxi driver with the passenger; and
  assigning the passenger to one of the first taxi driver or the second the taxi driver based on at least one of the set of ranked matches or at least one of,
    a conditional historical acceptance rate of the respective taxi driver,
    a stochastic assignment of either chance constraints or a conditional value at risk, or
    acceptance by the respective taxi driver.

9. The computer program product of claim 8, further comprising determining a paired passenger and taxi driver based on the taxi driver score and the passenger score.

10. The computer program product of claim 9, wherein determining a paired passenger and taxi driver based on the taxi driver score and the passenger score comprises solving a function by applying one of a deterministic approach and a stochastic approach.

11. The computer program product of claim 8, wherein matching the passenger to the first taxi driver and the second taxi driver based on the taxi driver score and the passenger score comprises applying a weight to one or more of the taxi driver score and the passenger score.

12. The computer program product of claim 8, wherein assigning a passenger to one of the first taxi driver or the second taxi driver based on a conditional historical acceptance rate comprises calibrating an upper bound and a lower bound of the conditional historical acceptance rate, wherein calibrating an upper bound comprises determining a taxi driver for each corresponding passenger based on a matched passenger and taxi driver exceeding a threshold score, and wherein calibrating a lower bound comprises determining a maximal system acceptance rate based on the matched passenger and taxi driver not exceeding the threshold score.

13. The computer program product of claim 8, wherein the conditional historical acceptance rate is generated as a probabilistic function of one or more of booking time, assignment time, weather conditions, booking locations, travel time, and waiting time.

14. A method of managing the adaptive dispatching of a taxi, the method comprising:
  receiving a request for a taxi, the received request being from a passenger;
  identifying the passenger based on at least one of a phone number and a request history;

detecting a location of a first taxi having a first driver and a second taxi having a second driver using global positioning satellite technology;

mapping the first taxi driver and the second taxi driver to a request for the taxi;

scoring each of the first taxi driver and the second taxi driver based on a deterministic factor comprising at least one of an acceptance rate for assignment, a rejection rate for assignment, an idle rate, and a frequency of job acceptance, wherein a score of the first taxi driver and a score of the second taxi driver are determined using statistical analysis in which at least a first deterministic factor carries a greater weight as compared to a second deterministic factor;

scoring the passenger based on at least one of a cancellation rate, a booking frequency, an abandonment rate, and a blacklist factor;

predicting a schedule for the first taxi driver and the second taxi driver to drive the passenger to a requested location, the predicted schedule being determined by an algorithm that adapts to a change based on an evolving pattern determined by at least the received request from the passenger, the detected location of the first taxi, and the detected location of the second taxi, the change being determined by an adjustment to weights based on a taxi driver score, a passenger score, and a combined score of the taxi driver and the passenger;

matching the passenger to the first taxi driver and the second taxi driver based on the respective taxi driver score, the passenger score, and the combined score of the respective taxi driver and the passenger, wherein the respective taxi driver score is computed based on a calibrated driver profile score derived from historical working performance calculated from an acceptance rate as a function of assignment time, a rejection rate as a function of assignment time, an idle rate as a function of a weather condition at the assignment time and as a function of the assignment time, and a frequency of job acceptance, wherein matching the passenger to the first taxi driver and the second taxi driver based on the respective taxi driver score and the passenger score comprises selecting, by the passenger, a respective taxi driver based on the respective taxi driver score exceeding a predetermined threshold, and selecting, by the respective taxi driver, a passenger based on the passenger score exceeding a predetermined threshold;

outputting a set of ranked matches comprising a first pair of the first taxi driver with the passenger and a second pair of the second taxi driver with the passenger;

assigning the passenger to one of the first taxi driver or the second the taxi driver based on at least one of the set of ranked matches or at least one of,
- a conditional historical acceptance rate of the respective taxi driver,
- a stochastic assignment of either chance constraints or a conditional value at risk, and; and
- acceptance by the respective taxi driver; or dispatching the assigned first taxi driver or the assigned second taxi driver to the passenger.

15. The method of claim 14, further comprising selecting a passenger and a taxi driver based on the taxi driver score and the passenger score.

16. The method of claim 15, wherein selecting a passenger and a taxi driver based on the taxi driver score and the passenger score comprises solving a function by applying one of a deterministic approach and a stochastic approach.

17. The method of claim 14, wherein assigning a passenger to one of the first taxi driver or the second taxi driver based on a conditional historical acceptance rate comprises calibrating an upper bound and a lower bound of the conditional historical acceptance rate, wherein calibrating an upper bound comprises determining a taxi driver for each corresponding passenger based on a matched passenger and taxi driver exceeding a threshold score, and wherein calibrating a lower bound comprises determining a maximal system acceptance rate based on the matched passenger and taxi driver not exceeding the threshold score.

18. The method of claim 14, wherein the conditional historical acceptance rate is generated as a probabilistic function of one or more of booking time, assignment time, weather conditions, booking locations, travel time, and waiting time.

19. The method of claim 14, wherein receiving a request for a taxi comprises the passenger requesting, through an electronic device associated with the passenger, a taxi to be dispatched to a location of the passenger, and wherein dispatching the taxi driver to the passenger comprises the taxi driver receiving, through an electronic device associated with the taxi driver, an instruction to proceed to the location of the passenger.

* * * * *